United States Patent [19]

White

[11] Patent Number: 5,058,003
[45] Date of Patent: Oct. 15, 1991

[54] VIRTUAL STORAGE DYNAMIC ADDRESS TRANSLATION MECHANISM FOR MULTIPLE-SIZED PAGES

[75] Inventor: Steven W. White, Saugerties, N.Y.

[73] Assignee: International Business Machines Corporation, Armonk, N.Y.

[21] Appl. No.: 285,176

[22] Filed: Dec. 15, 1988

[51] Int. Cl.⁵ .................. G06F 12/06; G06F 12/08; G06F 12/10; G06F 9/26

[52] U.S. Cl. .................. 364/200; 364/256.3; 364/256.5; 364/254; 364/254.3; 364/254.6; 364/256.4; 364/254.8; 364/259.1; 364/260.4; 364/452; 364/955; 364/956; 364/957; 364/957.1; 364/957.3; 364/961.2

[58] Field of Search ... 364/200 MS File, 900 MS File

[56] References Cited

U.S. PATENT DOCUMENTS

| | | | |
|---|---|---|---|
| 4,638,426 | 1/1987 | Chang et al. | 364/200 |
| 4,695,950 | 9/1987 | Brandt et al. | 364/200 |
| 4,768,146 | 8/1988 | Nagashima et al. | 364/200 |
| 4,774,659 | 9/1988 | Smith et al. | 364/200 |
| 4,797,814 | 1/1989 | Brenza | 364/200 |
| 4,823,259 | 4/1989 | Aichelmann, Jr. et al. | 364/200 |
| 4,876,646 | 10/1989 | Gotou et al. | 364/200 |
| 4,905,141 | 2/1990 | Brenza | 364/200 |
| 4,914,577 | 4/1990 | Steward et al. | 364/200 |
| 4,961,135 | 10/1990 | Uchihori | 364/200 |
| 4,980,816 | 12/1990 | Fukuzawa et al. | 364/200 |

Primary Examiner—Thomas C. Lee
Assistant Examiner—Mehmet Geckil
Attorney, Agent, or Firm—Robert L. Troike; John Black; George E. Clark

[57] ABSTRACT

A dynamic address translation mechanism includes a first directory-look-aside-table (DLAT) for 4KB page sizes and a second DLAT for 1MB page sizes. The page size does need not be known prior to DLAT presentation. When a virtual address is presented for translation, it is applied simultaneously to both DLATs for translation by either DLAT if it contains a page address entry corresponding to the virtual address presented. If a DLAT "miss" occurs, segment/page table searching is initiated. The DLAT page sizes are preferably made equal to the segment/page sizes and placed on 4KB and 1MB boundaries. Virtual page addresses lie within either a 1MB page or a 4KB page, and an entry for any virtual address can exist in only one (not both) of the DLATs.

9 Claims, 6 Drawing Sheets

VIRTUAL STORAGE DYNAMIC ADDRESS TRANSLATION MECHANISM FOR MULTIPLE-SIZED PAGES

BACKGROUND OF THE INVENTION

Dynamic address translation provides the ability to interrupt the execution of a program, record it and its data in auxiliary storage, such as a direct access storage device (DASD), and at a later time return the program and data to different main storage locations for resumption of execution. It can provide a user a system wherein storage appears to be larger than the main storage. This apparent storage (virtual) uses virtual addresses to designate locations therein and it is normally maintained in auxiliary storage. It occurs in blocks of addresses, called pages, and only the most recently referred-to pages are assigned to occupy blocks of physical main storage.

As the user refers to pages of virtual storage that do not appear in main storage, they are brought in to replace pages in main storage that are less likely to be needed in the near future.

Virtual addressing has become a key feature in the architecture of many large computers. Virtual addressing allows programs to appear logically contiguous to the user while not being physically contiguous in the storage system. Recently accessed portions of the virtual space are mapped into the main storage unit. The mapping information is often stored hierarchically in a directory comprising a segment table with entries corresponding to contiguous 1 MB (megabyte) segments and page tables with entries for 4 KB (kilobyte) pages within a segment.

Translation of the virtual address to a real address requires the mapping information that can be gained by searching the appropriate segment and page tables. As this searching process is time consuming, the number of full searches is reduced by retaining information for some of the recent translations in a Directory-Look-Aside-Table (DLAT). For virtual addresses covered by the DLAT, the translation process, which is required for almost every storage access, requires only a couple of machine cycles. For addresses not covered by the DLAT, the process of searching the directory ranges from about 15 to 60 cycles if the segment and page tables are in main storage. Each DLAT entry contains the information for mapping an entire page of storage, frequently 4 KB. The amount of storage covered by the DLAT depends on the number of entries in the DLAT and the size of the page.

When determining the optimal size for a page, a compromise is struck between a page large enough to amortize the overhead of swapping pages and a page small enough to incur minimal degradation due to granularity, i.e, not waste storage by committing a large page for a small object. While small (4 KB) pages may be appropriate for code segments (instructions) and small data objects, high performance scientific and engineering machines often benefit from large pages. In recent years, both data objects and the storage capacities have grown substantially; now a large page would often be more efficient. In comparison to data objects which are hundreds of megabytes, a 1 MB page offers sufficiently fine granularity.

Furthermore, with the introduction of fast, mass-storage devices in the order of one or more gigabytes (GB) such as the IBM Expanded Storage, the data transfer times for a 4 KB and 1 MB pages have been reduced to tens of cycles and thousands of cycles, respectively. With the thousands of cycles of software overhead which are incurred while resolving a page fault, resolving a 1 MB page fault may require only three to five times as long as a 4 KB page fault. For transfers of large, contiguous blocks of data, a 4 KB page system will incur the overhead hundreds of times that for page faults in a 1 MB page system.

Large pages provide many side benefits. For example, vector fetches and stores benefit from large pages simply by decreasing the number of possible page crossings. Even if the next required page is resident in physical storage, the vector pipe may be interrupted on a page crossing to verify that the page has been brought into the memory. This interruption can result in a noticeable performance degradation.

Large pages in the order of 1 MB may be useful as a possible solution for scientific applications which incur performance degradation as a result of the use of small pages. To optimize the page size for an application (or a portion of the application) multiple-size pages are desirable. To date, known DLATs are designed to handle a single page size; however to support other than a uniform page size, modifications to the current DLAT(s) would be required.

The CDC (registered trademark of Control Data Corporation) 7600 and CYBER 205 have both small and large pages. The Cyber 205 offers small (4 KB, 16 KB, and 64 KB) pages in which the page size selection must be made "via an operating system software installation parameter." Therefore, a given job can allow only one size of small page. However, a large page (512 KB) is also allowed. The CYBER translation unit handles multiple-sized pages by creating a list of "associative words". Each word contains information similar to a DLAT entry. This list is stored in main storage and the upper (most recently used) 16 entries can be loaded into an internal set of registers by instruction. The translation process consists of first searching within the internal registers. If a match (a "hit") is found, the entry is moved to the top of the list and the address is resolved. If no match is found in the first 16 entries, the rest of the list, in memory, is searched two entries at a time. If a matching entry is found, it is moved to the top of the list. Otherwise, a page fault is generated. This can require a large number of machine cycles.

Although the CYBER scheme allows a translation table to handle entries which are not of uniform size, it is not an attractive solution in the future high performance scientific processor market. The list of associative words defines all of the pages in physical storage. Although this may be practical for small storage requirements, future jobs require substantially more storage than is available on the CYBER. Some manufacturers are providing main storage of 256 MB and even 2 GB (gigabytes). These large real storages imply even greater data object sizes and larger virtual spaces to contain them. Even with 1 MB pages, a 1 GB data object would require 1000 pages; searching 2 entries per cycle could degrade performance substantially. Increasing the number of entries contained in the associative registers may be prohibitive based on the amounts of logic required.

U.S. Pat. No. 4,285,040 shows the support of multiple (two) page sizes, 128 B and 4 KB. The patented solution has many shortcomings; it is not feasible with large address spaces such as those required in high-performance scientific and engineering processors. The implementation described requires that registers be available to concurrently retain the base address values for all of the segments in the virtual address space. Even for large pages, such as 1 MB, current address spaces (2 GB) would require 2048 such registers. Furthermore, it is expected that user requirements will force the designers to allow substantially larger address spaces in the near future, thereby dramatically increasing the number of segment registers required for the approach described in the patent.

Due to the "cache-like" structure used to retain this segment information (1 MB) in the present application, the number of equivalent registers can be substantially reduced to approximately forty or fifty and still provide acceptable "hit-ratios", thereby allowing nearly optimal performance.

For accesses to data in small pages, additional storage accesses are required for the approach described in the patent. Quoting from near the top of the column labeled "3", "The subsegment descriptors are contained in a table stored in the storage of the system. Therefore, when the mechanism is operating in the second or subsegment mode, it is necessary to make an extra cycle to select and fetch one of the subsegment descriptors." This "extra cycle" is a storage reference cycle and on many processors (with large amounts of storage) this will translate to many processor cycles.

Due to the multiple "cache-like" structures of the present invention, the most recently used "page information" (subsegment descriptors) is readily available resulting in significant performance improvement. Generally, only a single search cycle is required.

Although the design described in the patent has good performance for accesses to "large" pages, the number of registers required to retain all of the segment pointers is unattractive for large address spaces. Furthermore, due to the exponentially larger number of page table entries, these entries must be stored in system storage. Therefore, for accesses to small pages, each "user" storage access results in two "real" storage accesses, one for the subsegment descriptor and one for the user data. As storage delays and storage contention contribute heavily to system performance degradation, such an approach would severely handicap a medium to high performance processor.

U.S. Pat. No. 3,675,215 describes a sequential search process which "continues with the count being incremented by one for each mismatch until the ID of the fetched entry matches the reque d virtual address, or until the count exceeds the number of addresses in the subset, in which case a missing address exception occurs". A set of "chains" of translation information is maintained. The virtual address translation process consists of searching a chain. For each "page fault", an entire chain is searched to detect the occurrence of the page fault.

The DLAT access of the present application is always as fast (sometimes tens of times faster) as the chain approach in providing the information required to translate the virtual address. This is primarily due to the associative (parallel) search inherent in the DLAT structure whereas the "chain" structure requires a serial search. The minimum and maximum number of cycles for finding a translated page in the "cache-like" structure of the present application is approximately two cycles. Furthermore, on the occurrence of a page fault, recognition of the fault is dramatically quicker with the DLAT/segment/page table scheme in comparison to the chain approach.

A preferred form of the present improvement includes a set associative arrangement which is used in systems such as the 308 X and 3090 families marketed by International Business Machines, Inc. Set associative arrangements are well known; and, for example, are used in the structures described in U.S. Pat. Nos. 4,638,426 and 4,695,950. Some of the virtual address bits are used to select one set of entries; the set of entries (usually two) is then associatively searched The set associative arrangement allows fast access to a large number of entries (usually 256 to 512) but requires a small associative search (usually two or four entries). The problem in applying this method to include multiple-sized pages comes in the selection of the bits which are used to select the set of entries. If DLAT entries can cover different page sizes, the bits must be selected from those which differentiate between storage segments that are at least as large as the largest page size. However, if these bits are used to select a set of DLAT entries, when the entries are for small pages, only a small contiguous block of memory can be covered. If a two-way set associative scheme is used with both 4 kB and 1 MB pages, the congruence class must cover a contiguous segment which is at least 1 MB. However, when entries correspond to 4 KB, only 8 KB (two entries) of the 1 MB contiguous space can be covered.

The present improvement provides a DLAT structure which can handle multiple-size pages concurrently. For purposes of illustration, the two page sizes used in this description will be 4 KB and 1 MB. A 1 MB page is considered since it is the equivalent of a non-pageable segment and segments are currently part of the preferred translation process. Once the segment information has been obtained, rather than continuing the process (determining a page within a segment), an entire segment would be considered a single entity. Since segments are on 1 MB virtual boundaries, this forces the 1 MB virtual pages to be on 1 MB boundaries. This diminishes the fragmentation problem encountered in multiple-size page systems and allows simplified hardware, the low order page offset bits simply pass through unchanged.

Since the IBM 3090 is a well-known machine, its DLAT facility will be used to describe the present improvement. The DLAT is two-way set associative with 128 pairs of entries, each entry representing a 4 KB page. To allow the DLAT to cover a large contiguous portion of storage, the pair of DLAT entries are selected using the congruence class selection address bits immediately above the offset bits which define words within a page, i.e. adjacent pages are covered by different DLAT pairs. However, the 128 pairs of entries only provide coverage for a small portion (eg. 1024 KB in one arrangement) of a presumed 2 GB space.

Without loss of generality, this improvement will be described by focusing on an implementation of such a DLAT with the exception that entries for both 4 KB and 1 MB will be allowed. In place of a single 128-pair DLAT in the 3090, the improvement will use two 64-pair DLAT structures, one for 4 KB pages and one for 1 MB pages. An inherent advantage of large pages is that a single 1 MB page provides coverage for a large contiguous portion of storage with a single entry, thereby increasing the probability of a DLAT hit and eliminating the costly search through the segment and page tables.

Accordingly it is a primary object of the present invention to provide in high performance data processing systems having very large fast main storage devices a dynamic address translation mechanism which is capable of far more efficient performance than those described in the prior art.

It is a more particular object of the present improvement to provide in a translation mechanism of the type described a pair of directory-lookaside-tables which are accessed simultaneously by a virtual address presented to the translation mechanism.

SUMMARY OF THE INVENTION

The above objectives are achieved in a preferred embodiment of the invention by providing a DLAT facility for 4 KB pages and a second DLAT facility for 1 MB pages. Each DLAT is a two-way set associative array, each with 64 pairs of entries. Although the partitions are different for the two facilities, the virtual address is partitioned into three fields. The low order bits which describe a byte within a page are the displacement bits (A20–A31 for 4 KB pages and A12–31 for the 1 MB pages). The 6 bits adjacent to the displacement bits are the congruence class selection bits. These bits (A14–A19 for 4 KB pages and A6–A11 for 1 MB pages) determine which pair of entries are referenced in each DLAT facility. The remaining (high-order) bits are the "tag" field.

In each DLAT facility, a first pair of entries are assigned to any pages having a congruence class selection field of "0". A second pair of entries are assigned to any page having a congruence class selection field of "1", another pair for "2", and so on until the final pair of entries which are assigned any page in the "63" congruence class. By using the congruence class selection bits of each address being translated to address a pair of entries in each DLAT facility, it is possible to determine whether or not the translation information for the address exists in these DLATs. Each entry in the DLAT includes a first portion which consists of the bits of the tag field of the corresponding virtual page, a second portion which includes the real page frame address of this page in real storage and a third section includes a validity bit indicating whether or not the tag and the associated real page frame number are in fact valid, that is such a page does presently exist in main storage. Nonpertinent DLAT fields, such as keys, etc. are not included in the present description.

When a virtual page address is presented to the DLATs by the system processor, respective congruence class selection bits (A14–19 or A6–11) read a pair of entries from each respective DLAT, and logic compares the tag field of each entry with corresponding bits of the virtual address presented to the DLATs. If there is an equal compare, i.e. a directory hit, and the valid bit is "on", the real page address of the entry which caused the hit is placed on the real address bus of the system for accessing main store. At the same time the displacement address bits are concatenated to the real page address for addressing the selected bit or bytes in main storage.

Since both DLATs are accessed simultaneously by the virtual address and since their pairs of entries are read out and compared with selected virtual address bits at the same time there is no loss in performance in DLAT structure by having two DLATS instead of one.

In the event that there is no DLAT hit, a conventional segment/page table translation sequence is initiated.

4 KB pages and 1 MB pages are used exclusively with only one DLAT. Each page has an entry in only one of the DLATS; an address (virtual or real) is in either a 4 KB page or a 1 MB page. Hardware allows 4 KB and 1 MB page table entries to be placed only in the DLAT for 4 KB and 1 MB pages respectively. Therefore a hit in one of the two DLATS guarantees a miss in the other DLAT.

As in any multiple-size page memory-management system, the operating system plays a role in enforcing certain restrictions. It is assumed that the operating system will keep 1 MB pages (real and virtual) on 1 MB boundaries. Currently 4 KB pages (real and virtual) are maintained on 4 KB boundaries. The 1 MB page size is preferred since System 370 operating systems support 1 MB segments. A 1 MB page (virtual) is therefore almost equivalent to existing segments in these operating systems which are on 1 MB boundaries.

The major change in such operating systems would be to require real address space to have 1 MB pages on megabyte boundaries. Today there are only 4 KB page frames which exist on 4 KB boundaries. By modifying the operating systems to block out physical memory into 1 MB partitions pages, rather than 4 KB, several advantages can be obtained. Some of the 1 MB blocks can be used for backing up 1 MB pages while the remainder of the 1 MB blocks can be partitioned into 256 4 KB pages. The operating system can therefore manage some number of 4 KB pages and some number of 1 MB pages. If the number of 1 MB and 4 KB pages are determined statically, currently used algorithms can be used to manage 4 KB and 1 MB pages. Future management schemes can allow a more efficient dynamic conversion between a 1 MB block of 4 KB page frames and a 1 MB page of physical storage. As more pages from a given size are required some pages of the other size can be converted. To aid in gathering continuous "free" 4 KB pages to form a 1 MB page a conceptual dividing line (which can be varied) can be used to partition the upper portion of the storage (1 MB pages) from the lower portion (4 KB pages).

Keeping 1 MB pages on 1 MB boundaries reduces fragmentation problems. This restriction also greatly simplifies the hardware. The low order bits (which select bytes within a page) can simply pass through the translation unit without modification. Furthermore, it decreases the number of bits required for each entry in the page/segment tables and in the DLAT.

The foregoing and other objects, features and advantages of the present improvement will he apparent from the following more particular description of the preferred embodiment of the invention as illustrated in the accompanying drawings.

DESCRIPTION OF THE PREFERRED EMBODIMENT

Figure 1A:
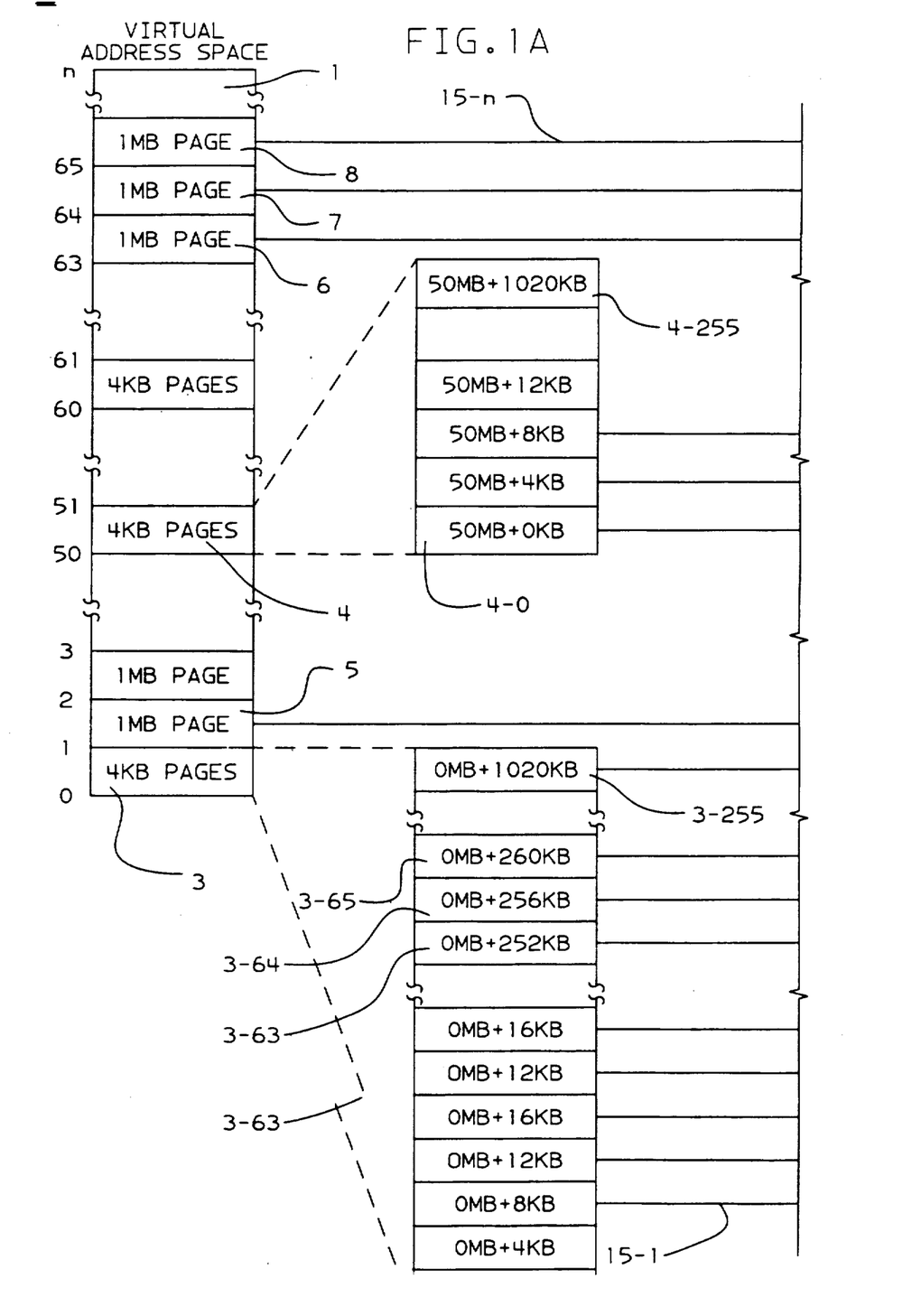
FIGS. 1A and 1B, taken together, diagrammatically illustrate mapping of 4 KB and 1 MB virtual pages into 4 KB and 1 MB real address spaces.
Figure 1B:
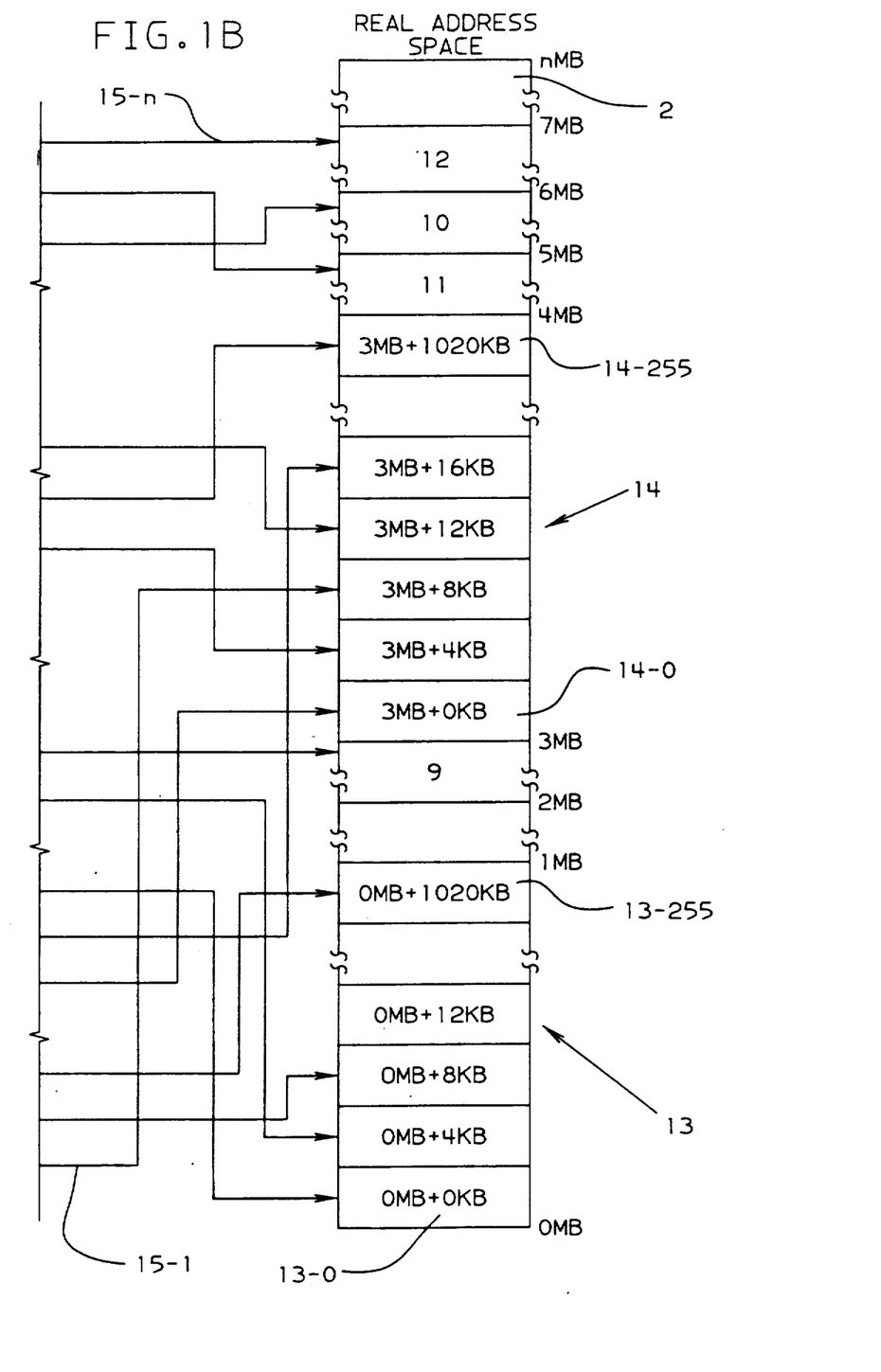

With reference to FIGS. 1A and 1B, it will be seen that both the virtual address space 1 (FIG. 1A) and the real address space 2 (FIG. 1B) are divided into a number of 1 MB blocks from 0 MB to nMB. The virtual space blocks 3 and 4 (FIG. 1A) beginning with 0 MB and 50 MB address values are divided into groups of 256 4 KB pages 3-) to 3-255 and 4-0 to 4-255. On the other hand the 1 MB blocks 5-8 with starting virtual addresses of 1 MB, 63 MB, 64 MB and 65 MB define 1 MB pages in the virtual address space. The blocks 5-8 are mapped into real address blocks 9-12 respectively.

Certain of the 4 KB pages in the blocks 3 and 4 are mapped into respective 4 KB page frames 13-0 to 13-255 and 14-0 to 14-255 of real address blocks 13 and 14.

Figure 2:
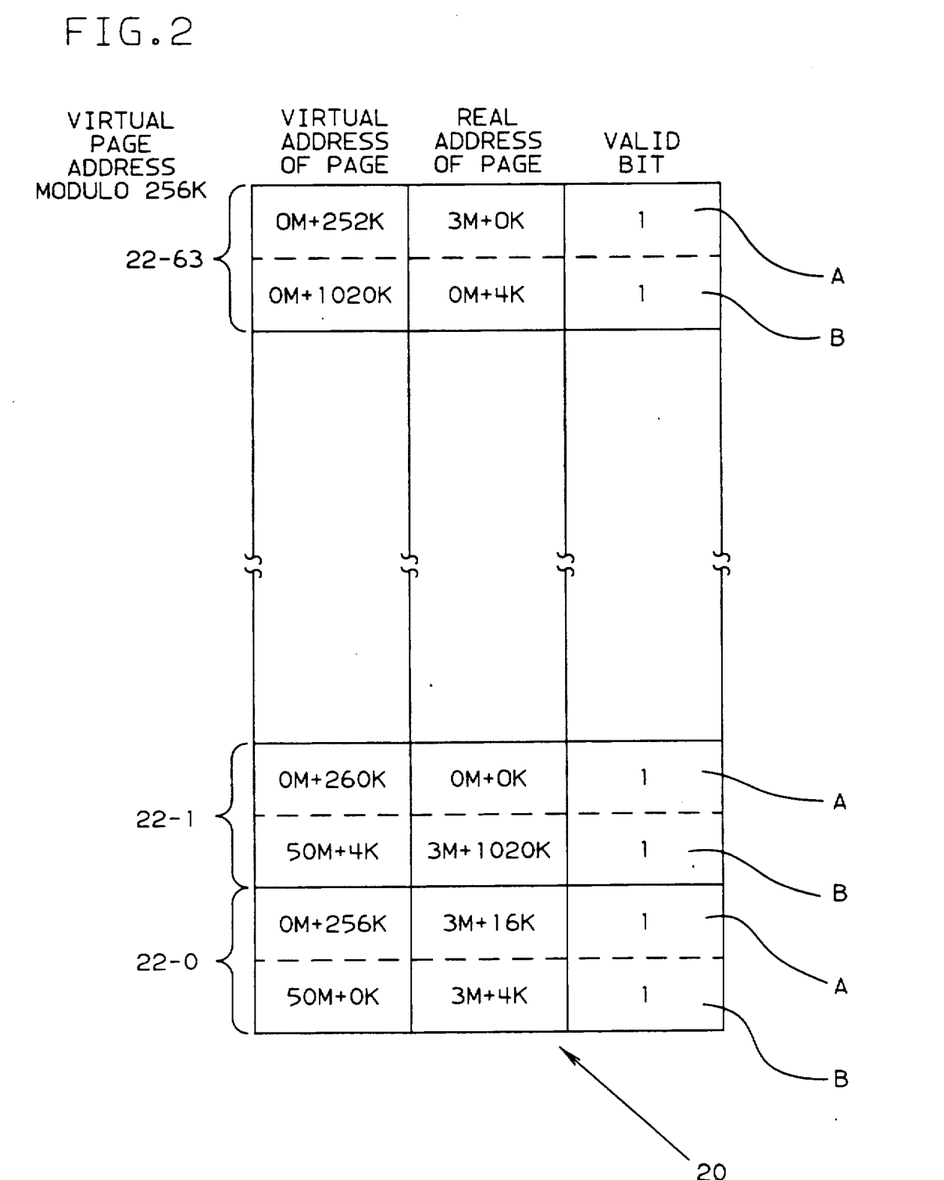
FIG. 2 is a fragmentary diagrammatic illustration of the 4K DLAT array and representative entries which are found therein in accordance with the mapping of FIG. 1.
Figure 3:
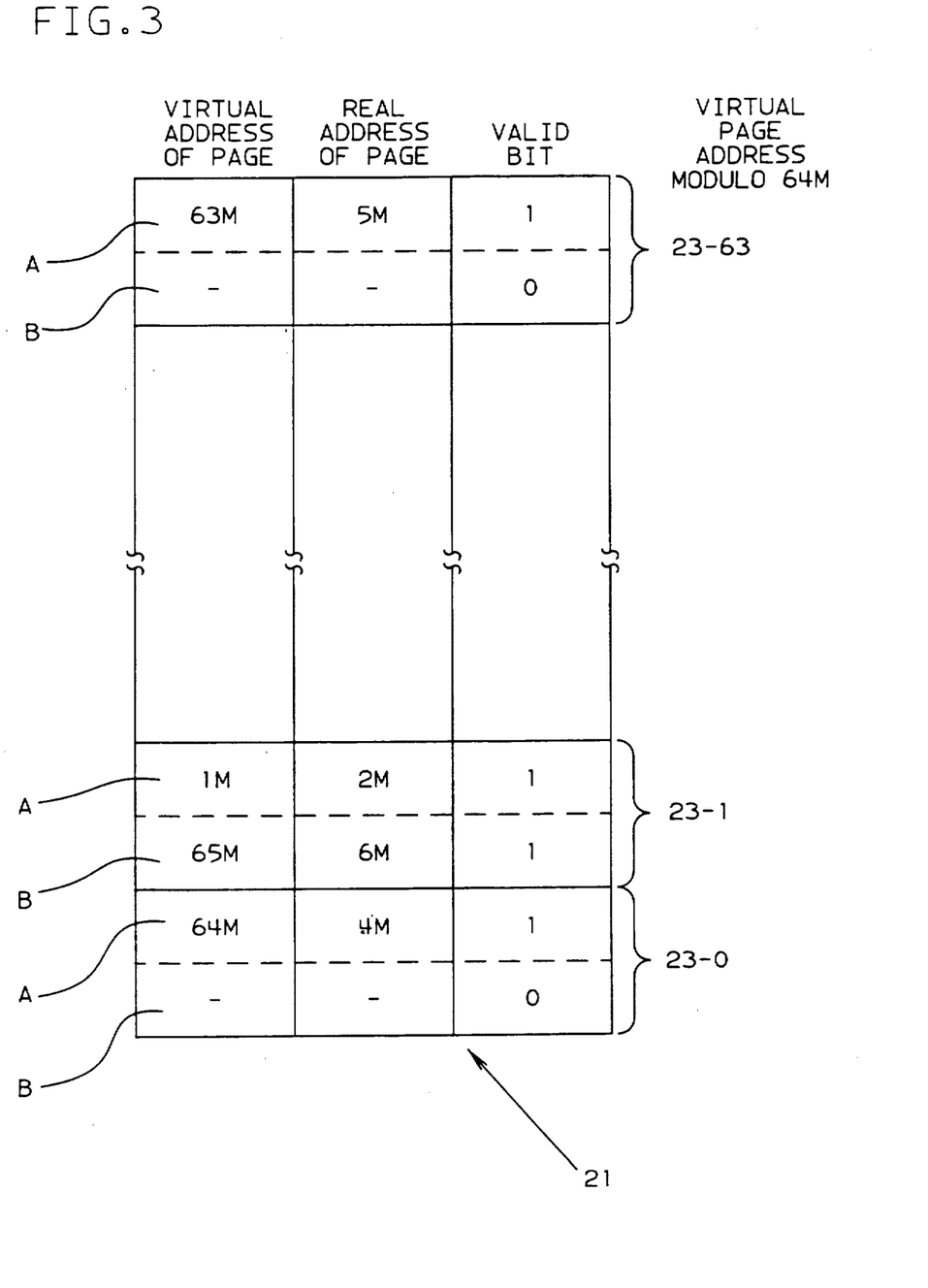
FIG. 3 is a fragmentary diagrammatic illustration of the 1 MB DLAT array and representative entries which are found therein in accordance with the mapping of FIG. 1.

For purposes of illustrating the present improvement, it will be assumed that all of the virtual pages described above have been transferred into (mapped) main storage 2 (the real address space) from DASD (not shown). It is further assumed that certain of the virtual pages in space 1 connected by arrows 15-1 to 15-n to respective page frames into main storage 2 are the most recently referenced pages in their congruence classes and are therefore found as entries in the 4 K page DLAT 20 (FIG. 2) and the 1 MB page DLAT 21 (FIG. 3). Hardware (not shown) automatically reloads DLAT entries from page tables in main storage 2 as required.

The congruence classes 0-63 for DLAT 20 are assigned to page addresses 0, 4K, 8K ... 252K; for DLAT 21, to page addresses 0, 1M, 2M, 3M ... 63M.

Each of the DLAT 20 and 21 of the present improvement is preferably a two-way set associative array with sixty-four (64) pairs of entries (22-0 to 22-63 and 23-0 to 23-63) each pair representing one congruence class for 4 KB and 1 MB pages respectively. The two entries in each pair are labeled A' and B respectively.

The DLAT pair 22-0 (FIG. 2) includes in entry B (1) an address value of 50 MB, the value of tag bits A0–A13 of virtual page 4-0 of FIG. 1, (2) the real page address value 3 MB+4 KB of the page in main store 2 which has stored therein the information contained (i.e. the contents of) the virtual page, and (3) a valid bit =1.

Entry A of pair 22-0 includes (1) the value (0 MB+256 KB) of tag bits A0–A13 for virtual page 3-64 (FIG. 1A), (2) the real page address (3 MB+16 KB) in main store 2 into which the virtual page was mapped and (3) a valid bit=1.

Similarly, DLAT entry pairs 22-1 and 22-63 contain valid entries (tag bit values and real page addresses) for virtual pages 4-1, 3-65, 3-255, and 3-63 of FIG. 1A and the main store 2 FIG. 1B page frames into which their contents have been stored.

In entry pair 23-0 of DLAT 21 shown in FIG. 3, entry B has been rendered invalid (valid bit=0) and entry A includes the valid entry (tag field value=64 MB and real page address=4 MB) for the virtual page 7 of FIG. 1 and page 11 in main store 2 (FIG. 1B) into which the contents of virtual page 7 have been stored.

Similarly, entry pair 23-1A, B and entry 23-63A, include valid entries for virtual pages 5, 8 and 6, respectively, and the main store pages 9, 12 and 10 into which their contents have been stored.

When (during program execution) a virtual address is presented by a processor to the DLATs 20 and 21 (FIG. 4), virtual address bits A14–A19 (FIG. 5) select a pair of entries from DLAT 20 and virtual address bits A6 to A11 (FIG. 4) select a pair of entries from DLAT 21.

Figure 4:
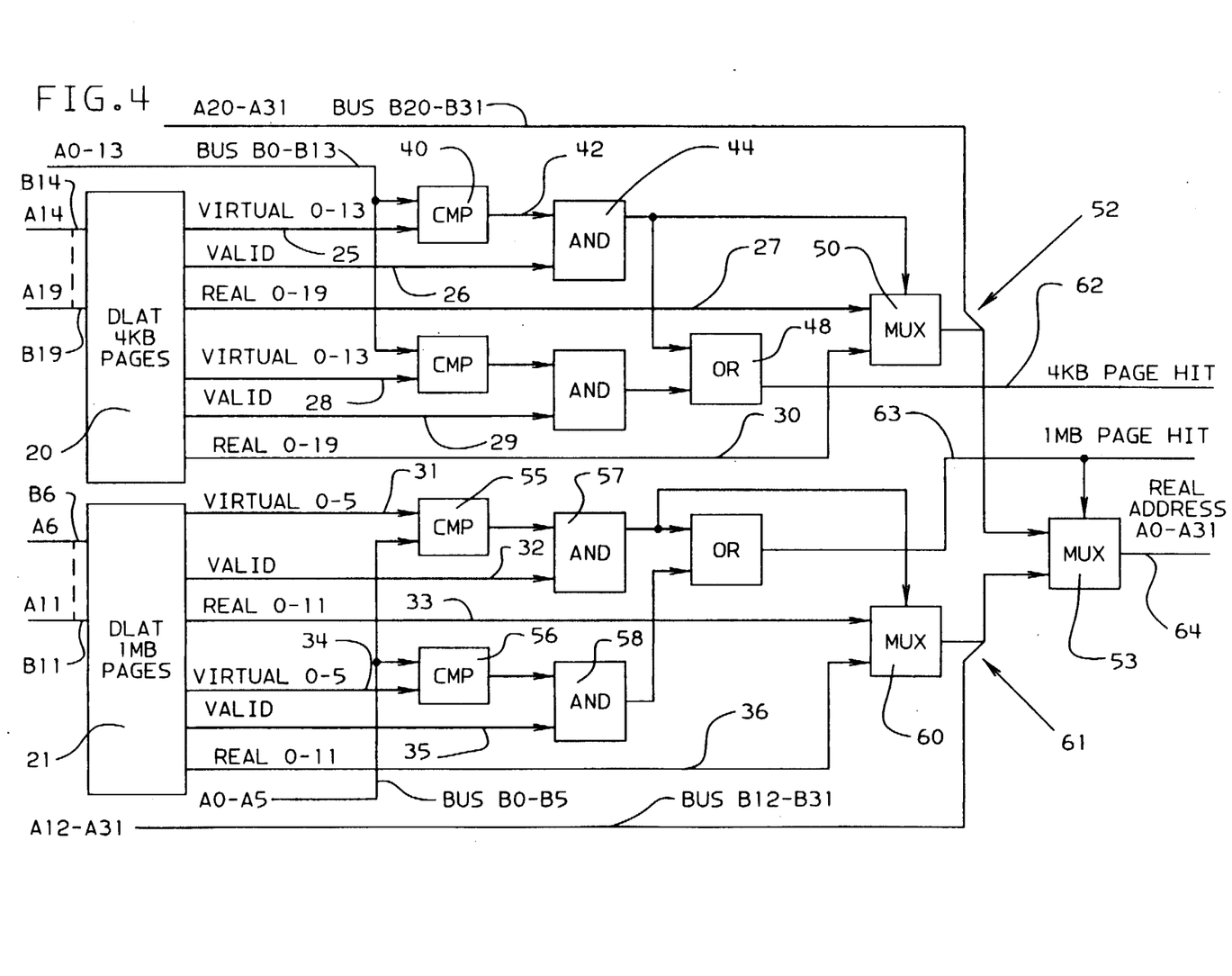
FIG. 4 is a diagrammatic/schematic illustration of the DLAT arrays and hardware logic used to translate presented virtual addresses into real addresses for presentation to a main storage.

However, the operating system, when it maps a virtual block (4K or 1 MB), permits a virtual memory entry to only one of the DLATS 20 and 21 by assigning a block size (4 KB or 1 MB) to all of the virtual addresses in that block (page). Thus when a new entry is made for an accessed virtual address, hardware (not shown) notes the page size, assigns the virtual page to the appropriate DLAT 20 or 21, and stores the appropriate tag bits A0–A13 into DLAT 20 or A0–A5 into DLAT 21.

Accordingly, when a presented virtual address causes the selection of a pair of entries (as described above) only one pair from one DLAT can possibly contain the appropriate tag bits for a DLAT "hit".

Reference is directed to FIG. 4 which shows the DLATs 20 and 21 and the virtual address bits A0–A31 received on processor address bus lines B0–B31.

Congruence selection bits A14–A19 and A6-A11 are applied to DLATs 20 and 21 via bus lines B14–B19 and B6–B11. The DLAT 20 has entry A and B outputs 25, 26, 27 and 28, 29, 30. DLAT 21 has entry A and B outputs 31, 32, 33 and 34, 35, 36. Virtual address tag bits A0–A13 in one pair of A and B DLAT entries selected by congruence class bits A14–19 are applied to outputs 25 and 28; valid bits in the entry pair are applied to outputs 26 and 29; and real address bits are applied to outputs 27 and 30.

Similarly, tag, valid and real address bits in one DLAT entry pair, selected by congruence class bits A6–A11, are applied to outputs 31, 34 and 32, 35 and 33, 36 of DLAT 21.

Outputs 25 and 28 form inputs to compare circuits 40, 41 respectively; bus lines B0–B13 form second inputs to the compare circuits 40, 41. The outputs 42, 43 of compare circuits 40, 41 form inputs to logical AND circuits 44, 45 and entry A and B valid outputs 26, 27 form second inputs to the AND circuits 44, 45.

The outputs 46, 47 of the AND circuits 44, 45 are applied to a logical OR circuit 48; and output 46 forms a select input to a multiplexor 50. The real address outputs 27 and 30 form inputs to the multiplexor 50. The output 51 of multiplexor 50 is conconcatenated to the offset bit bus lines B20–B31 at junction 52 and applied to one input to a multiplexor 53.

Identical logical means and connections are provided for DLAT 21, including entry A and B compare circuits 55, 56, AND gates 57, 58, OR circuit 59 and multiplexor 60. The output of multiplexor 60 is concatenated at junction 61 to page offset bit bus lines B12–B31 and both are coupled to second inputs to the multiplexor 53.

The outputs 62 and 63 of OR circuits 48 and 59 are used to gate signals on the lines at junction 52 or 61 through the multiplexor 53 to the real address lines A0–A31 main of 1 storage address bus 64.

However, this occurs during a DLAT access, i.e. OR circuit 48 produces a logical "1" signal on 4 KB page hit line 62 or OR circuit 59 produces a logical "1" signal on 1 MB page hit line 63, only if a compare equal occurs in one of the circuits 40, 41 or 55, 56 and the valid bit (corresponding to the one compare circuit) equals "1".

The operation of the DLAT facilities in FIG. 4 will now be described. When a processor (not shown) issues a command to read data from or write data to main storage 2 (FIG. 1B), virtual address bits A0–A31 are placed on bus lines B0–B31. The congruence class bits A14–A19 and A6–A11 selects corresponding pairs of entries in the DLATs 20 and 21. Compare circuits 40 and 41 compare the tag bits A0–A13 of the selected entries A and B of DLAT 20 with bits A0–A13 on bus lines B0–B13; and circuits 55, 56 compare tag bits A0–A5 stored in the selected entries A and B of DLAT 21 with virtual address bits A0–A5 on bus lines B0–B5.

If one of the circuits 40, 41, 55, 56 finds an equal compare and the corresponding valid bit equals "1", then the corresponding AND gate 44, 45, 57 or 58 produces a logical "1" output signal which is applied by one of the OR circuits 48 or 59 to page "hit" line 62 or 63. Both multiplexors 50 and 60 gate through one of the two real page frame addresses applied to their inputs depending upon the logical "1" or "0" output state of the AND gate 44 and AND gate 57.

Figure 5:
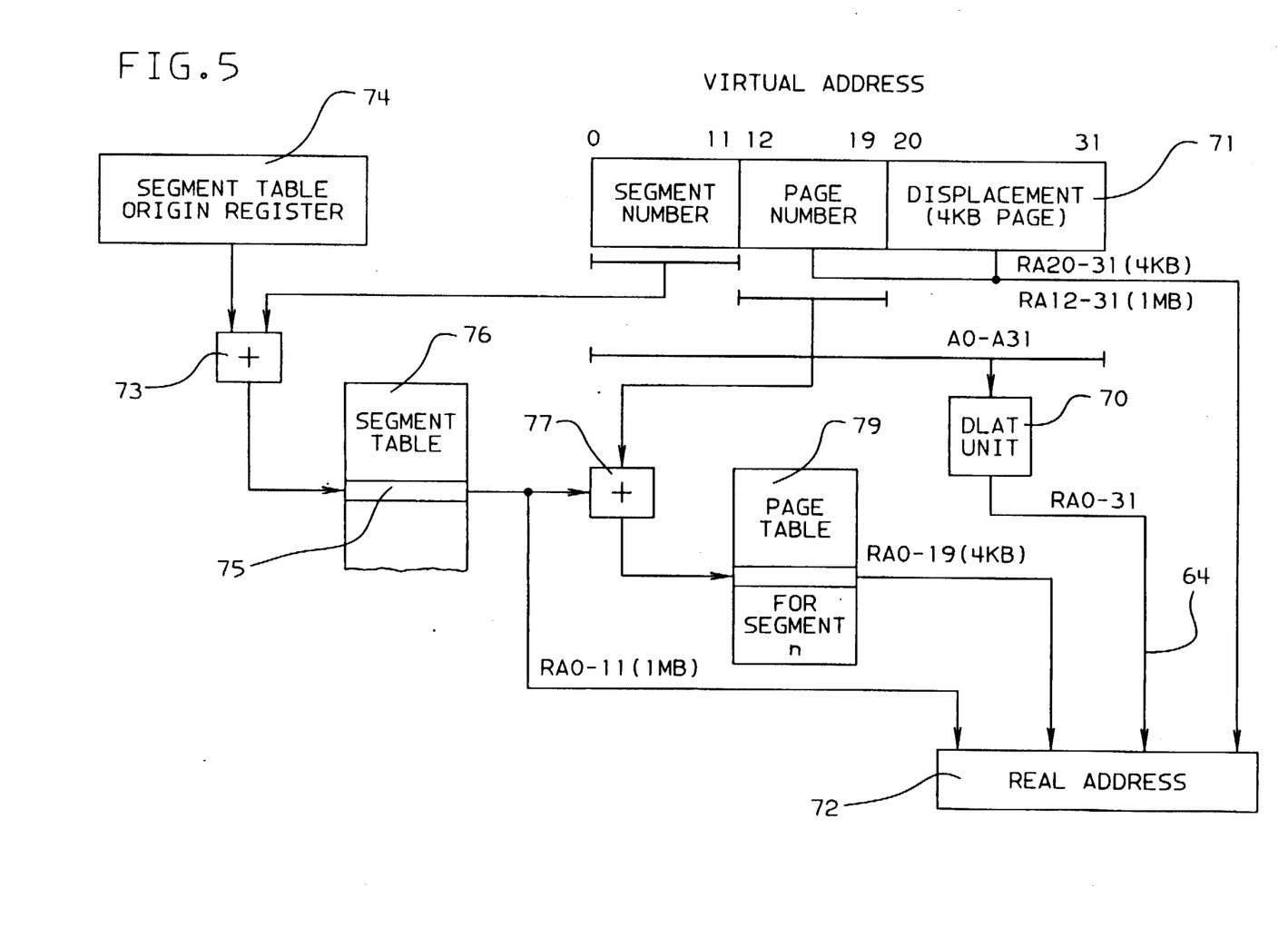
FIG. 5 is a block diagram illustrating a preferred form of the dynamic address translation mechanism using segment tables and page tables together with the improved DLAT unit for fast translations of recently used virtual addresses.

The outputs on lines 62, 63 notify the processor (not shown) that (1) a directory (DLAT) "hit" was made in a 4 KB or 1 MB page and the real address is on bus 64 or (2) no directory "hit" was made; and the real address must be obtained by searching the segment and page tables in main storage (as shown in FIG. 5). Such table search operations are well known and are shown and described at page 205 of an Introduction to Operating Systems by H. M. Deitel reprinted 1984 and in greater detail in the IBM System/370 Principles of Operation (GA22-7000-10) published by International Business Machines in September 1987 starting at page 3-20.

In the event of a page fault, i.e., the desired page has no entry in the segment page tables because the page is not in main store 2, the processor must access the page from an auxiliary device such as DASD via an I/O operation.

Briefly, a DLAT unit 70 (FIG. 5) is comprised of DLAT arrays and associated hardware logic of the type shown and described with respect to FIG. 4 herein. The unit 70 is coupled to a source 71 of the virtual address for a desired unit of information. The virtual address includes a segment number (bits A0–A11), a page number (bits A12–A19) and a displacement (or offset) address value (bits A20–A31). This assumes that segments are on 1 MB boundaries in the virtual address space, and pages are on 4 KB boundaries.

Address bits A0–A31 applied to the DLAT unit 70 in the manner described with respect to FIG. 4. If a DLAT "hit" occurs, the real address bits RA0–RA31 are applied to a real address destination 72 via bus 64.

If no DLAT "hit" occurs, the segment/page table mechanism of FIG. 5 is rendered active to locate the desired page. The segment number is added at 73 to a segment table origin value in register 74 to access an entry 75 in a segment table 76 in main storage 2.

Further action depends on whether the virtual address is in a 1 MB or a 4 KB page. For 1 MB pages, the entry 75 will have been filled with the real (physical) page address bits RA0–RA11, which will be directed to destination 72 without further table searching; and the page number bits RA12–RA19 and displacement bits 20–31 together form the offset for the desired data in the 1 MB page accessed from entry 75.

For 4 KB pages, the entry 75 will have been filled with the starting address of page table 79 of the segment defined by entry 75.

The address value in entry 75 is concatenated with the page number at 77 to access an entry 78 in a page table 79 in main storage 2. The entry 78 includes the page frame bits RA0–RA19 of the real address of the desired page. The page offset bits RA20–RA31 are concatenated with bits RA0–RA19 at 72.

This assumes that the desired page is a valid page presently found in main storage 2. If the page is not found in main storage 2 by this table search a page fault occurs; and the page must be accessed from an auxiliary storage device via I/O operations.

It will be apparent from the above description of the preferred embodiment of the present improvement, that changes may be made by those skilled in the art without departing from the true spirit and scope of the present invention; and the appended claims are intended to cover all such changes.

What is claimed is:

1. A dynamic storage address translation system connected between a central processing unit and a storage system for translating virtual addresses supplied by said central processing unit to real addresses and for accessing blocks of data in said storage system, each said block of data being one of a plurality of different block sizes, said dynamic storage address translation system comprising:

a plurality of dynamic address translation means, one for each block size, and each said dynamic address translation means including a set-associative table with a plurality of congruence class locations;

at least one entry in each congruence class location for storing high order tag bits of a predetermined virtual page, a real block address of the predetermined virtual page and a page valid bit, each said dynamic address translation means responsive to a respective, unique congruence class selection field and a unique tag bit field of a supplied virtual address for determining whether or not the real block address corresponding to the supplied virtual address is stored in a congruence class entry of its set-associative table addressed by its unique congruence class selection field of the supplied virtual address.

2. The dynamic storage address translation system of claim 1 having first and second block sizes equal respectively to segment and page sizes in the storage system, wherein the blocks of data are maintained on address boundaries of segments and pages, and wherein a virtual address entry can be placed only in the table corresponding to its block size.

3. The dynamic storage address translation system of claim 2 wherein two translation means are provided for block sizes of 4 KB and 1 MB or 4 KB and 1 MB boundaries respectively, and wherein each virtual address has an entry in only that set-associative table corresponding to the block size in which the address lies.

4. The dynamic storage address translation system of claim 1 further comprising:

means responsive to a page valid bit in said congruence class entry for providing a real block address to said storage system.

5. The dynamic storage address translation system of claim 4 further comprising circuit means for comparing corresponding high order bits of a supplied virtual address with the tag bit fields or entries in the set-associative tables addressed by the congruence class selection fields of the supplied virtual address.

6. The dynamic storage address translation system of claim 4 further comprising:

means responsive to said means for providing a real block address for concatenating, to said real block address, a block offset portion of said supplied virtual address for presentation to said storage system.

7. A method performed by a dynamic storage address translation system connected between a central processing unit and a storage system for converting virtual addresses supplied by said central processing unit into real storage addresses and for accessing blocks of data in said storage system, each block of data being one of a plurality of different block sizes, each block size being equal to the size of a corresponding virtual page size within a virtual space, comprising the steps of:

storing in congruence class entries of a plurality of set-associative arrays, one array for each block size, high order virtual address tag bits and real block address bits of recently-referenced virtual pages mapped into real blocks of storage space, simultaneously accessing those congruence class entries in each set-associative array corresponding to its unique congruence class selection field in a supplied virtual address, simultaneously comparing the tag bits in the accessed entries of each set-associative array with corresponding high order bits in the supplied virtual address, and selecting real block address bits of an entry which compares equal.

8. In a large, high performance data processing system having a virtual address space arranged in pages including a large page size and a significantly smaller page size, wherein said large and small pages are mapped respectively into large and small real storage blocks of corresponding size on large and small page boundaries, a method performed by a dynamic address translation system connected between a central processing unit and a storage system for converting virtual addresses having high order tag bits, congruence class bits and low order page offset bits, supplied by said central processing unit into real storage addresses for accessing blocks of data in said storage storage comprising the steps of:

storing in congruence class entries of a pair of set-associative arrays, one for each block size, high order virtual address tag bits and real block address bits of recently-referenced virtual pages, simultaneously accessing congruence class entries in each array corresponding to its unique congruence class selection bits in a supplied virtual address;

simultaneously comparing the tag bits in the accessed entries of each array with corresponding bits in the supplied virtual address;

selecting the real block address bits of an accessed entry which compares equal and concatenating said real block address bits to page offset bits of the supplied virtual address to form a real storage address, and in the event of no compare equal between the tag bits of the accessed entries and the supplied virtual address:

(1) searching a segment table for a valid real block address corresponding to the supplied virtual address of a large page and concatenating the offset bits of the supplied virtual address to the valid real block address in a successful search to form a real storage address, or (2) searching a segment table and page tables for a valid real block address corresponding to the supplied virtual address of a small page and concatenating a smaller group of offset bits of the supplied virtual address to the valid real block address in a successful search to form a real storage address.

9. The method of claim 8, wherein the large pages are 1 MB in size mapped into 1 MB real storage blocks on 1 MB boundaries, and wherein the small pages are 4 KB in size mapped into 4 KB real storage blocks on 4 KB boundaries within 1 MB virtual and real spaces assigned to 4 KB page and block sizes.

* * * * *